US012602309B2

(12) United States Patent
Collado Umana et al.

(10) Patent No.: US 12,602,309 B2
(45) Date of Patent: Apr. 14, 2026

(54) DETECTING UNWANTED SOFTWARE USING A MACHINE LEARNING OPERATION

(71) Applicant: CYLANCE INC., Plano, TX (US)

(72) Inventors: Julian Collado Umana, Irvine, CA (US); Aaron Mark Tresch Fienberg, Irvine, CA (US)

(73) Assignee: CYLANCE, INC., Plano, TX (US)

( * ) Notice: Subject to any disclaimer, the term of this patent is extended or adjusted under 35 U.S.C. 154(b) by 253 days.

(21) Appl. No.: 18/465,391

(22) Filed: Sep. 12, 2023

(65) Prior Publication Data

US 2025/0086093 A1 Mar. 13, 2025

(51) Int. Cl.
G06F 11/362 (2025.01)

(52) U.S. Cl.
CPC ................................. G06F 11/362 (2013.01)

(58) Field of Classification Search
CPC ............................. G06F 11/362; G06F 21/562
See application file for complete search history.

(56) References Cited

U.S. PATENT DOCUMENTS

| | | | | |
|---|---|---|---|---|
| 10,372,913 B2 * | 8/2019 | Harms | ................... | G06F 21/568 |
| 11,726,889 B1 | 8/2023 | Rao et al. | | |
| 12,111,930 B2 * | 10/2024 | Alasmari | .............. | G06F 21/566 |
| 2018/0018459 A1 | 1/2018 | Zhang et al. | | |
| 2018/0157845 A1 | 6/2018 | Mehta | | |

| | | | |
|---|---|---|---|
| 2018/0309793 A1 | 10/2018 | Ardanza Azcondo et al. | |
| 2019/0363925 A1 | 11/2019 | Davis et al. | |
| 2020/0274894 A1 | 8/2020 | Argoeti et al. | |
| 2021/0312058 A1 | 10/2021 | Chiarelli et al. | |
| 2021/0357436 A1 | 11/2021 | Filios et al. | |
| 2022/0179957 A1 | 6/2022 | Kuskov et al. | |
| 2023/0007023 A1 | 1/2023 | Andrabi et al. | |
| 2023/0127836 A1 | 4/2023 | Batson et al. | |

OTHER PUBLICATIONS

Jacob A. Harer et al., Automated software vulnerability detection with machine learning, Aug. 2, 2018, arXiv, retrieved online on Nov. 20, 2025. Retrieved from the Internet: <URL: https://arxiv.org/pdf/1803.04497>. (Year: 2018).*
International Search Report and Written Opinion in International Appln. No. PCT/US2024/046001, mailed on Oct. 24, 2024, 15 pages.
International Search Report and Written Opinion in International Appln. No. PCT/US2024/046041, mailed on Nov. 20, 2024, 13 pages.

* cited by examiner

*Primary Examiner* — Hanh Thi-Minh Bui
(74) *Attorney, Agent, or Firm* — Fish & Richardson P.C.

(57) ABSTRACT

Systems, methods, and software can be used to determine whether a software code is unwanted. In some aspects, a method includes: obtaining, by an electronic device, a set of software features of a software code; obtaining, by the electronic device, a set of user features of a user of the electronic device; and determining, by the electronic device, a classification score of the software code based on the set of software features and the set of the user features, wherein the classification score indicates whether the software code is potentially unwanted for the user.

17 Claims, 4 Drawing Sheets

*200*

┌─────────────────────────────────┐ ⟩⟋*210*
│ Obtaining, by an electronic device, a set │
│ of software features of a software code │
└─────────────────────────────────┘
                  │
                  ▼
┌─────────────────────────────────┐ ⟩⟋*220*
│ Obtaining, by the electronic device, a set of user │
│ features of a user of the electronic device │
└─────────────────────────────────┘
                  │
                  ▼
┌─────────────────────────────────┐ ⟩⟋*230*
│ Determining, by the electronic device, a classification score of the │
│ software code based on the set of software features and the set of │
│ the user features, wherein the classification score indicates whether │
│ the software code is potentially unwanted for the user │
└─────────────────────────────────┘

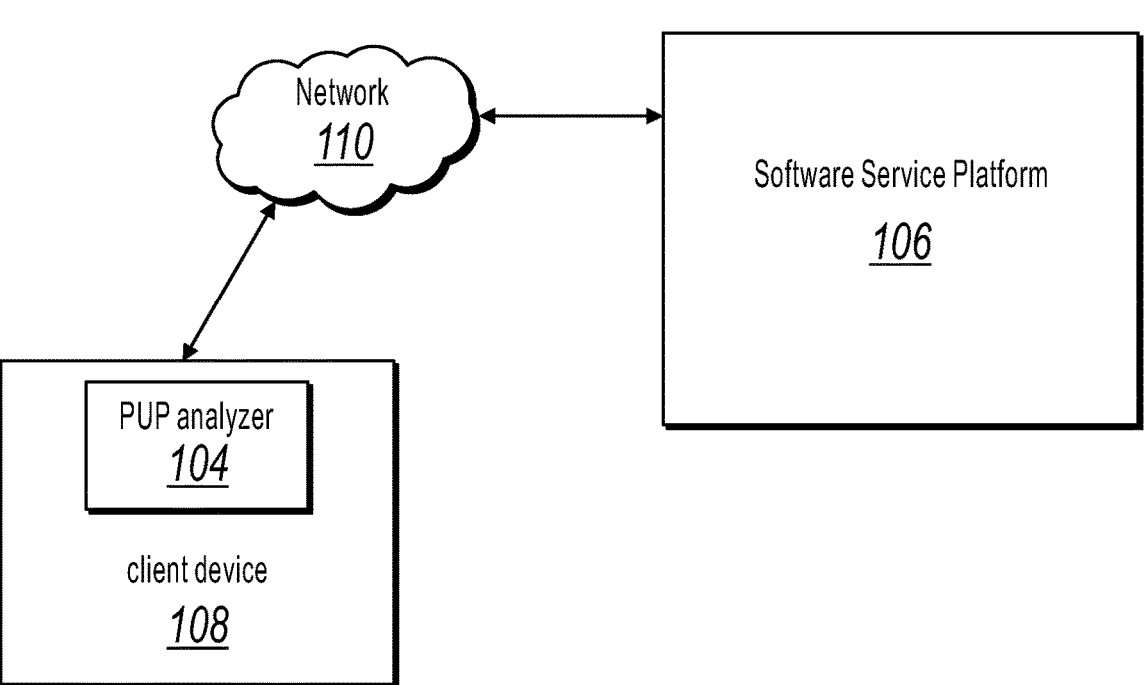
FIG. 1

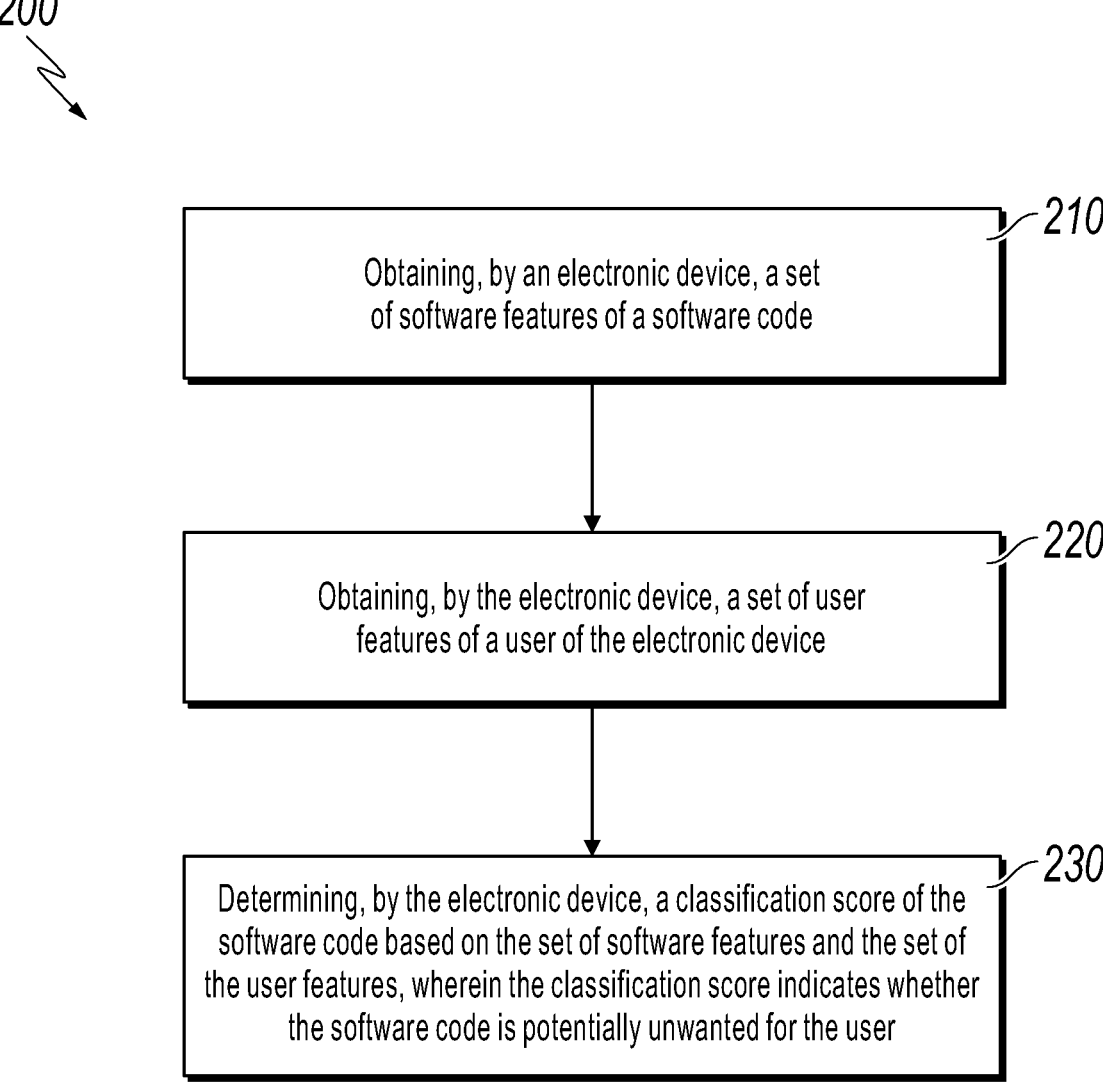

*200*

*210*

Obtaining, by an electronic device, a set of software features of a software code

*220*

Obtaining, by the electronic device, a set of user features of a user of the electronic device

*230*

Determining, by the electronic device, a classification score of the software code based on the set of software features and the set of the user features, wherein the classification score indicates whether the software code is potentially unwanted for the user

FIG. 2

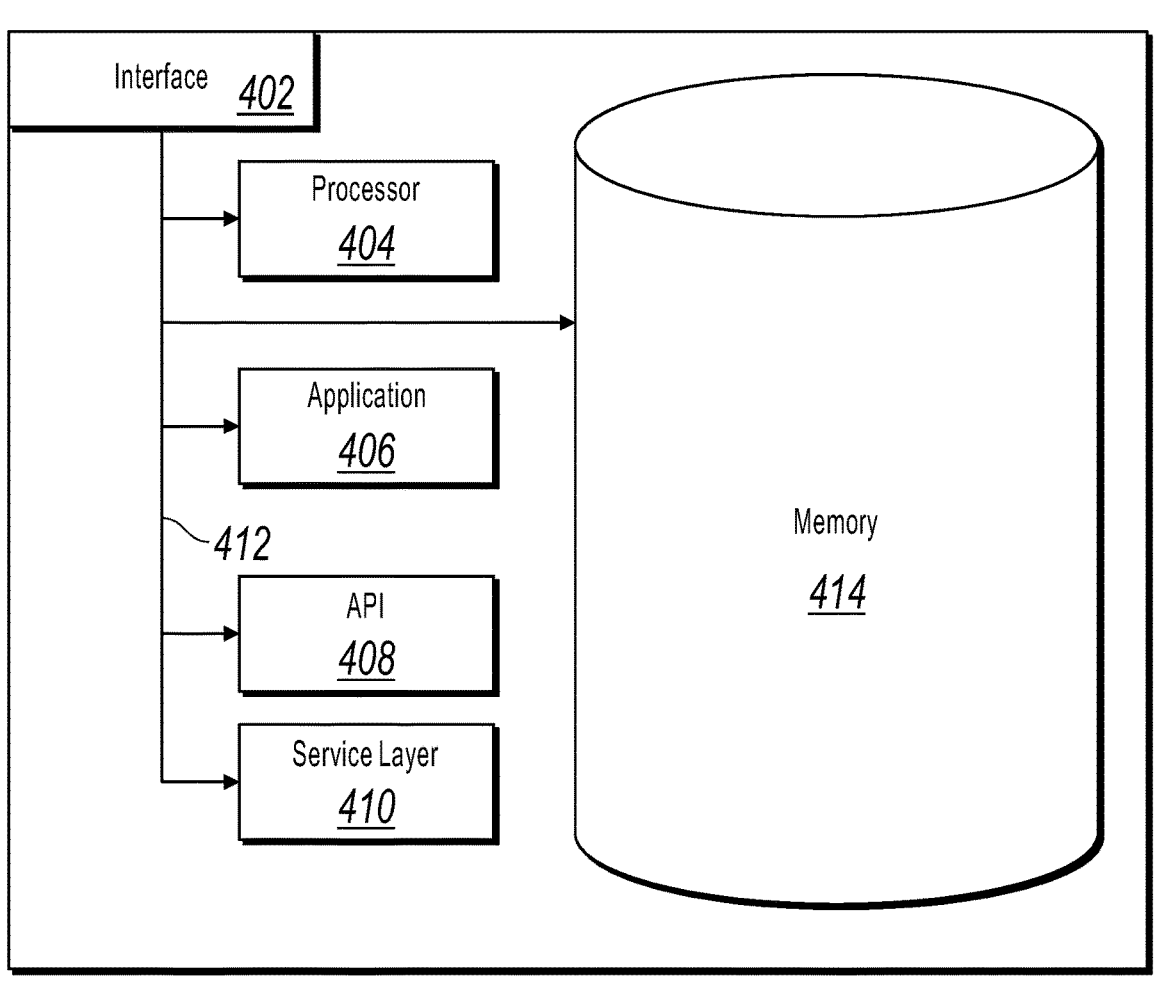
FIG. 4

DETECTING UNWANTED SOFTWARE USING A MACHINE LEARNING OPERATION

TECHNICAL FIELD

The present disclosure relates to detecting unwanted software by using a machine learning operation.

BACKGROUND

In some implementations, a machine learning model can be used in software classification to detect malware. For example, the machine learning model can be used to determine whether a software code may contain malware code and thus, incur security risk.

DESCRIPTION OF DRAWINGS

FIG. 1 is a schematic diagram showing an example system that determines whether a software code is PUP, according to an implementation.

FIG. 2 is a flowchart showing an example method for an operation of detecting unwanted software, according to an implementation.

FIG. 4 illustrates a high-level architecture block diagram of a computer according to an implementation.

Like reference numbers and designations in the various drawings indicate like elements.

DETAILED DESCRIPTION

Figure 3:
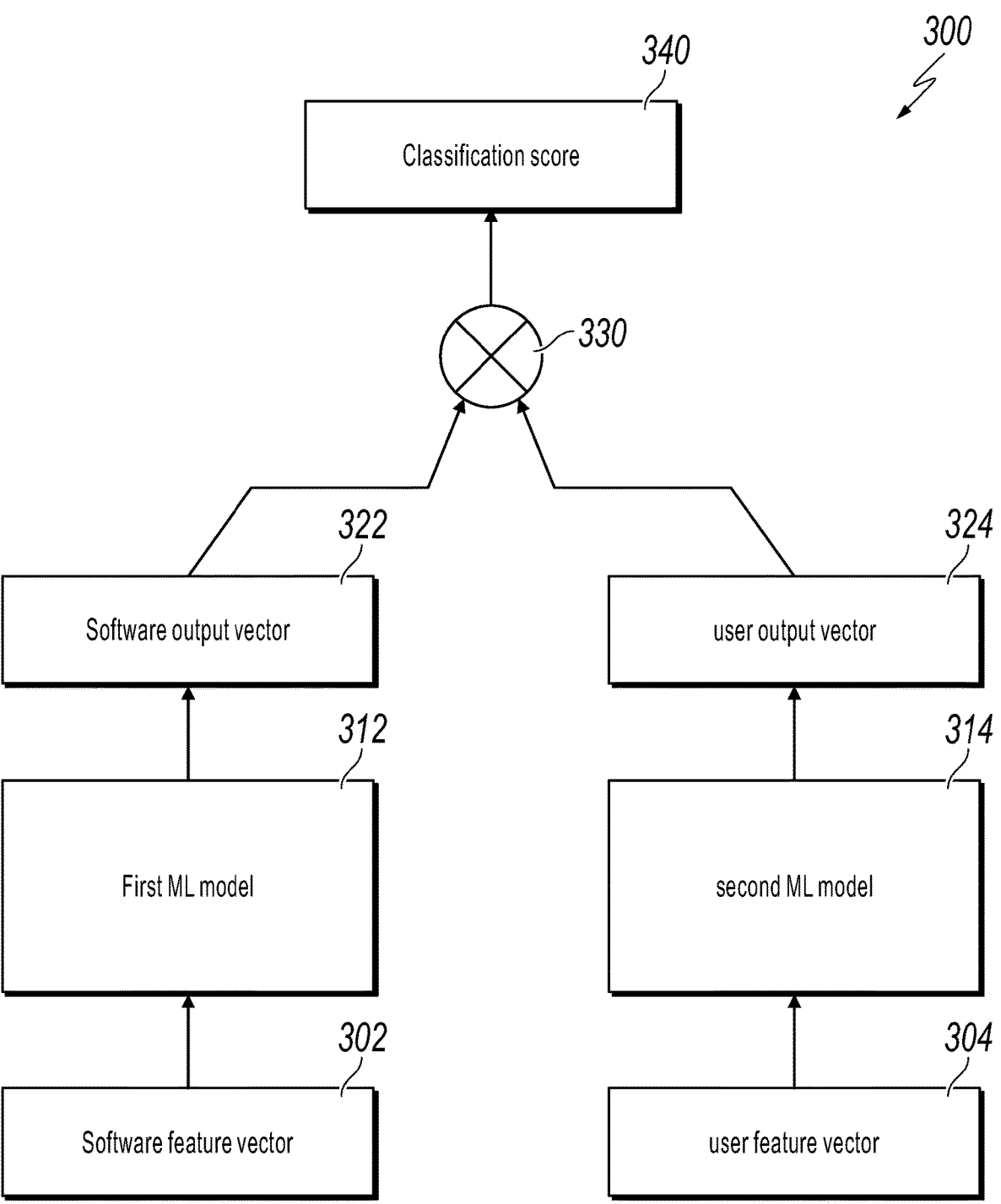
FIG. 3 is a schematic diagram illustrating an example operation that determines the classification score, according to an implementation.

A software classification operation can be improved to detect a Potentially Unwanted Program (PUP). While malware detection determines whether a software code is malicious, PUP detection determines whether a software code is unwanted to a particular user. A software code that is malicious is PUP. On the other hand, a software code that is benign can also be PUP to a particular user. For example, a network monitoring software is benign for a network engineer but would be considered PUP for a salesman. Identifying PUP can improve the classification performance by tailoring the classification operation to a particular user or organization. This can also prompt an administrator of an organization to restrict the type of software code available to certain users.

In some cases, crowd sourcing-based or collaborative filtering approaches can be used in the classification operation, where the usage information of a group of users that share the same characteristics of a particular user can be used to determine whether a software code is PUP for a particular user. For example, if the software code has been uninstalled by a group of users that share the same characteristics of a particular user, such statistics information can be used to determine that the software code is PUP for the particular user. However, these approaches can have some drawbacks. The software code may be new and thus statistics information of other users may not be available. The statistics information of other users may contain noise that may not be accurate to predict whether the software code is PUP specifically for this particular user.

In some cases, a machine learning operation that processes the information of the software code and information of the user and the device jointly, can be used to determine whether a software code is PUP. This approach can improve the accuracy of PUP classification for a particular user. FIGS. 1-4 and associated descriptions provide additional details of these implementations.

FIG. 1 is a schematic diagram showing an example system 100 that determines whether a software code is PUP, according to an implementation. At a high level, the example system 100 includes a client device 108 that is communicatively coupled with a software service platform 106 over a network 110.

The client device 108 represents an electronic device that installs and runs a software code. In some cases, a browser or a client application can be executed on the client device 108 to communicate service requests and service responses with a server such as the software service platform 106, to obtain software services.

The client device 108 includes a PUP analyzer 104. The PUP analyzer 104 represents an application, a set of applications, software, software modules, hardware, or any combination thereof, that determine whether a software code is PUP. In some implementations, the PUP analyzer 104 can obtain software features of the software code, user features including information of the client device 108 and the user that uses the client device 108. The software features and the user features can be used to calculate a classification score for the software code. In some cases, machine learning operations including multiple machine learning models are used to determine the classification score. The PUP analyzer 104 can use the classification score to determine whether the software code is PUP. In some cases, the calculation can be performed by the PUP analyzer 104. Alternatively, the client device 108 can send the information representing the software features and the user features to the software service platform 106 to calculate the classification score. FIGS. 2-4 and associated descriptions provide additional details of these implementations.

The software code analyzed by the PUP analyzer 104 can be source code or binary code. In a software development process, source code can be created by programmers using a text editor or visual programming tool prior to compilation. The source code can be developed with a human-readable programming language and may be saved in a text file. The source code can be transformed by an assembler or a compiler into binary software code that can be executed by the computer. In some cases, the source code can be generated by automated tools, e.g., artificial-intelligence powered by large language models.

The binary software code can include a stream of bytes that are generated by compiling the source code. Thus, the binary software code may not be in a human-readable format and may not be easily parsed or analyzed by a human.

The binary software code can be in a configuration of object code, executable code, or bytecode. An object code is the product of compiler output of a sequence of statements or instructions in a computer language. The source code can be logically divided into multiple source files. Each source file is compiled independently into a corresponding object file that includes an object code. The object codes in the object files are binary machine codes, but they may not be ready to be executed. The object files can include incomplete references to subroutines outside themselves and placeholder addresses. During the linking process, these object files can be linked together to form one executable file that includes executable code that can be executed on a computing device. During the linking process, the linker can read the object files, resolve references between them, perform the final code layout in the memory that determines the addresses for the blocks of code and data, fix up the placeholder addresses with real addresses, and write out the executable file that contains the executable code.

A bytecode, also referred to as portable code or p-code, is a form of instruction set designed for efficient execution by a software interpreter. Bytecodes include compact numeric codes, constants, and references (normally numeric addresses) that encode the result of compiler parsing and performing semantic analysis of things like type, scope, and nesting depths of program objects. The bytecode includes instruction sets that have one-byte opcodes followed by optional parameters. Intermediate representations such as the bytecode may be output by programming language implementations to ease interpretation or may be used to reduce hardware and operating system dependence by allowing the same code to run cross-platform, on different devices. The bytecode may often be either directly executed on a virtual machine (a p-code machine i.e., interpreter), or it may be further compiled into machine code for better performance. In some cases, binary software code that is coded using platform-independent languages such as JAVA can be stored in the bytecode format.

The software service platform 106 represents an application, a set of applications, software, software modules, hardware, or any combination thereof, that provides software services to the client device 108. The software service platform 106 can be an application server, a service provider, or any other network entity. The software service platform 106 can be implemented using one or more computers, computer servers, or a cloud-computing platform. The software service platform 106 can be used to train machine learning models that are used in the PUP determination operation. In some cases, the software service platform 106 can send a threshold score to the client device 108 for PUP determination. In some cases, the software service platform 106 can calculate the classification score.

Turning to a general description, the client device 108 may include, without limitation, any of the following: endpoint, computing device, mobile device, mobile electronic device, user device, mobile station, subscriber station, portable electronic device, mobile communications device, wireless modem, wireless terminal, or another electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example system 100 includes the network 110. The network 110 represents an application, set of applications, software, software modules, hardware, or combination thereof, that can be configured to transmit data messages between the entities in the example system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flowchart showing an example method 200 for an operation of detecting unwanted software, according to an implementation. The example method 200 can be implemented by an electronic device, e.g., the client device 102 shown in FIG. 1, a server, e.g., the software service platform 106 shown in FIG. 1, or a combination thereof. The example method 200 shown in FIG. 2 can be implemented using additional, fewer, or different operations, which can be performed in the order shown or in a different order.

At 210, the electronic device obtains a set of software features of a software code. The software code can be source code or binary code. The software code can be code of software already installed on the electronic device or software pending installation on the electronic device. The pending installation can occur after a user device downloads an application, or receives an over-the-air update, or receives a user interface action that triggers an installation of a previously stored application. Prior to the installation, the method 200 can be triggered to determine whether the software code is PUP. The software code can be code of software received and pending execution on the electronic device, e.g., a script received over the Internet. Prior to the execution, the method 200 can be triggered to determine whether the software code is PUP. The software code can be code received in a message, e.g., an attachment of an email. Prior to the displaying or storing the attachment, the method 200 can be triggered to determine whether the software code is PUP. Alternatively, or additionally, the method 200 can be triggered according to a security policy on the electronic device to scan software already installed on the electronic device. The security policy can be configured by a manufacturer, an owner or a user of the electronic device. The security policy can also be configured by an administrator of an organization that is associated with the user of the electronic device, e.g., an Information Technology (IT) administrator of an employer of the user. The security policy can configure a periodic or event-triggered scan of the electronic device, to determine whether any of the currently installed software is PUP. In some implementations, the electronic device can maintain a record of the software that has already been examined in previous scan. Therefore, in each scan, the electronic device only needs to check the software installed on the electronic device that has not been previously examined or has been modified since the previous examination to determine whether it is PUP.

The software features include information of the software code that can be used to determine whether the software code is PUP. Examples of the software features include file size, file format, file type (e.g., whether the software code is binary or source code), file content (part or all of the software code), associated operating system or programming environment, the number of particular strings included in the code, the structure of the code (e.g., the order of a set of instructions), signature, checksum, and etc. The features of a software code can be obtained from metadata associated with the code, from a preprocess operation that scans the software code and extracts the feature information automatically from the code, or both.

In some operations, each software feature can be converted to a numerical value, in format of integer numbers or floating point numbers. The numerical values can be concatenated into one or more software feature vectors. Alternatively or additionally, the numerical values can be combined or transformed to generate the one or more software feature vectors. Example of the transformation or combination techniques include multiplication, addition, passing through a non-linear transformation function (e.g., Fourier, Rectifying, or etc.).

At 220, the electronic device obtains a set of user features of a user of the electronic device. The user features include information of the user that uses the electronic device. Examples of the user features include user profile information such as the name of the user, the employer and job title of the user, geographic location of the user (e.g., country and state). In some cases, information of the user profile can be obtained through a user profile file. For example, the IT administrator of the employer of the user can generate a user profile file that contains user profile information of the user and stores the user profile on the electronic device. Alternatively, or additionally, the user can provide the user profile information into the electronic device through a user interface.

Examples of the user features also include information of usage behavior and pattern, e.g., browsing history, access history (including e.g., read/write/keystroke/audio/video/screen access), application installation history, application usage history, etc. In some cases, information of usage behavior and pattern can be obtained by processing user data that captures the user activity pattern on the electronic device. In some cases, the electronic device can be used by only one user, and thus the information of usage behavior and pattern of the user is the same as the information of usage behavior and pattern of the electronic device. In other cases, the electronic device can be used by multiple users, and thus the information of usage behavior and pattern of the user may be different for each user. In these cases, the information of usage behavior and pattern of the user and the user profile information for the particular user that triggers the method 200 by attempting to install the software code is collected as the user features information.

Examples of the user features also include information of the electronic device, e.g., the hardware configuration information including memory, processor, graphics, input and output interface, the software configuration information including operating system, other software already installed on the electronic device, etc. In some cases, information of the electronic device can be obtained through a configuration file of the electronic device, e.g., system configuration file.

In some operations, each user feature can be converted to a numerical value, in format of integer numbers or floating point numbers. The numerical values can be concatenated into one or more user feature vectors. Alternatively or additionally, the numerical values can be combined or transformed to generate the one or more user feature vectors. Example of the transformation or combination techniques include multiplication, addition, passing through a non-linear transformation function (e.g., Fourier, Rectifying, or etc.).

At 230, the electronic device determines a classification score of the software code based on the set of software features and the set of the user features.

In some cases, the calculation of the classification score can be performed by a server. In these cases, the electronic device can send information of the software features and user features to the server for the server to process. In some cases, the electronic device can perform the conversion process to generate the software feature vector and the user feature vector and sends the software feature vector and the user feature vector to indicate the information of the software features and user features. Alternatively, the electronic device can send the information of the software features and user features in text string and the server can convert them into the software feature vector and the user feature vector. In some cases, the electronic device can encrypt the text string before sending to the server. Additionally or alternatively, the electronic device can anonymize the private information of the user in the information of the software features and user features, and send the anonymized version to the server.

In other cases, the calculation of the classification score can be performed by the electronic device.

In some implementations, the classification score can be calculated by using a machine learning (ML) operation. FIG. 3 is a schematic diagram 300 illustrating an example operation that determines the classification score, according to an implementation. The illustrated operation can be implemented as computer programs on one or more computers in one or more locations, in which the systems, components, and techniques described below can be implemented.

The schematic diagram 300 includes a first ML model 312 and a second ML model 314. The first ML model 312 and the second ML model 314 can be implemented by using any appropriate machine learning model architecture that enables it to perform its described function. For example, when configured as a neural network, the first ML model 204 may include at least one neural network layer, e.g., at least one fully connected layer or convolutional layer or transformers. Alternatively or additionally, the first ML model 204 may be a graph neural network, a recurrent neural network, other machine learning models, or any combinations thereof. In the case of multiple neural network layers, they may be stacked, so as to pass data successively between them in a certain layer order. Each neuron in one layer is connected to some or all neurons in the next layer.

In some cases, the ML models, e.g., the first ML model 312 and the second ML model 314 can include the following layers: an input layer that takes input vectors and passes them to the rest of the network; one or more hidden layers that are intermediate layers between the input and output layer and process the data by applying complex non-linear functions to them, and an output layer that takes as input the processed data and produces the final results.

The hidden layers transform the input features into processed features. Each layer is implemented by using mathematical functions that apply weights to the input to produce an output specific to an intended result. In some cases, hidden layers can be implemented in a hierarchical way, where each layer in the hidden layers is specialized in producing one transformation for a target result and passes the output values to the next layer for further processing.

The first ML model 312 and the second ML model 314 can have the same or different types. For example, both the first ML model 312 and the second ML model 314 can be a transformer neural network, but they may have different number of layers or neurons. In another example, the first ML model 312 and the second ML model 314 can be machine learning models of different types, e.g., a transformer neural network and a convolutional neural network. In some cases, the first ML model 312 and the second ML model 314 are trained jointly on a training dataset. Alternatively, the first ML model 312 and the second ML model 314 can be trained separately on the same or different datasets.

In the illustrated example, the first ML model 312 takes software feature vector 302 as input and generates software output vector 322. The second ML model 314 takes user feature vector 304 as input and generates user output vector 324. The software feature vector 302 and the user feature vector 304 can have the same or different lengths. The software output vector 322 and the user output vector 324 have the same length.

A dot product operation 330 can be performed on the software output vector 322 and the user output vector 324 to produce the classification score 340. Additionally or alternatively, other combination or transformation functions (e.g., concatenation) can be used to combine the software output vector 322 and the user output vector 324 to produce a combined value that is used to determine the classification score 340, e.g., by comparing the combined value to a threshold. In one example, cosine similarity between the software output vector 322 and the user output vector 324 can be calculated and used as a metric of similarity.

In some implementations, instead of using two ML models as illustrated in FIG. 3, one ML model can be trained to generate the classification score. In one example, the software feature vector and the user feature vector can be concatenated to form one joint input vector. The one ML model can process the joint input vector and generate the classification score.

In some implementations, instead of using the dot product operation 330 to obtain the classification score as illustrated in FIG. 3, a third ML model can be used to determine the classification score. Like the first ML model 312 and the second ML model 314 discussed previously, the third ML model can be implemented by using any appropriate machine learning model architecture, e.g., a neural network such as a multilayer perceptron (MLP), a graph neural network, or a recurrent neural network. The third ML model can take the software output vector 322 and the user output vector 324 as the inputs, and provides the classification score as output. The third ML model can be trained jointly or separately with the first ML model 312 and the second ML model 314.

In addition to or as alternative to the software output vector 322 and the user output vector 324, the third ML model can use other inputs that are provided by the first ML model 312 and the second ML model 314. Examples of these other inputs can include residual connections of the first ML model 312 or the second ML model 314. Examples of the residual connections can include representations of part or all of the inputs of the first ML model 312 or the second ML model 314, representations of internal processing results of one or more internal layers of the first ML model 312 or the second ML model 314, or any combinations therefore.

In some cases, the electronic device can compare the classification score with a threshold score to determine whether the software code is PUP. For example, if the classification score is larger than the threshold score, the software code is determined to be PUP. Alternatively, if the classification score is smaller the threshold score, the software code is determined to be PUP. In some cases, a security policy can be used to configure whether the software code is determined to be PUP based on different comparison results, i.e., the classification score is larger than the threshold score, the classification score is smaller than the threshold score, or the classification score is the same as the threshold score.

The threshold score can be stored on the electronic device. The threshold score can be generated by the server and sent to the electronic device prior to the method 200 being triggered. The server can send an updated threshold score to the electronic device periodically or upon request by the electronic device. In some implementations, the server calculates the classification score, compares with the threshold score, and sends an indication to the electronic device to indicate the comparison result.

In some cases, a notification may be generated. For example, the notification can be generated in response to the software code being determined to be PUP. The notification can include indication of whether the software code is determined to be PUP. The notification can also include the classification score, the threshold score, information of the software feature, information of the user feature, or any combination thereof. The notification can be output in a user interface of the electronic device. In some case, a visual or audio alert may be outputted at the electron device to indicate that the software code is PUP. Alternatively, or additionally, the notification can be sent to another device, e.g., a manager server of the employer of the user, for alert.

If the software code is determined not to be PUP, the electronic device can proceed to install the software code in the case that the software code is pending installation, or keep the software code in the case that the software code is already installed.

If the software code is determined not to be PUP, different handling mechanisms can be configured. For example, a notification can be outputted on the user interface of the electronic device to indicate that the software code is PUP. The notification can also include the classification score, the threshold score, information of the software feature, information of the user feature, or any combination thereof. The user can select different options such as delete without installing, uninstall, quarantine, keep, or proceed to install. Alternatively, or additionally, a security policy can be provisioned on the electronic device to configure any of the handling mechanisms.

FIG. 4 illustrates a high-level architecture block diagram of a computer 400 according to an implementation. The computer 400 can be implemented as the software service platform 106 and the client device 108 of FIG. 1. The computer 400 can also be used to implement the operations discussed in FIGS. 2-3. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

In some cases, the processing algorithm of the code package establishment can be implemented in an executable computing code, e.g., C/C++ executable codes. In some cases, the computer 400 can include a standalone Linux system that runs batch applications. In some cases, the computer 400 can include mobile or personal computers.

The computer 400 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 400 can serve as a client, network component, a server, a database or other persistency, and/or any other components. In some implementations, one or more components of the computer 400 may be configured to operate within a cloud-computing-based environment.

At a high level, the computer 400 is an electronic computing device operable to receive, transmit, process, store, or manage data. According to some implementations, the computer 400 can also include or be communicably coupled with an application server, e-mail server, web server, caching server, streaming data server, business intelligence (BI) server, and/or other server.

The computer 400 can collect data of network events or mobile application usage events over network 110 from a web browser or a client application, e.g., an installed plugin. In addition, data can be collected by the computer 400 from internal users (e.g., from a command console or by another appropriate access method), external or third parties, other automated applications, as well as any other appropriate entities, individuals, systems, or computers.

Each of the components of the computer 400 can communicate using a system bus 412. In some implementations, any and/or all the components of the computer 400, both hardware and/or software, may interface with each other and/or the interface 402 over the system bus 412 using an Application Programming Interface (API) 408 and/or a service layer 410. The API 408 may include specifications for routines, data structures, and object classes. The API 408 may be either computer language-independent or -dependent and refer to a complete interface, a single function, or even a set of APIs. The service layer 410 provides software services to the computer 400. The functionality of the computer 400 may be accessible for all service consumers using this service layer. Software services, such as those provided by the service layer 410, provide reusable, defined business functionalities through a defined interface. For example, the interface may be software written in JAVA, C++, or other suitable languages providing data in Extensible Markup Language (XML) format or another suitable format. While illustrated as an integrated component of the computer 400, alternative implementations may illustrate the API 408 and/or the service layer 410 as stand-alone components in relation to other components of the computer 400. Moreover, any or all parts of the API 408 and/or the service layer 410 may be implemented as child or sub-modules of another software module, enterprise application, or hardware module without departing from the scope of this disclosure.

The computer 400 includes an interface 402. Although illustrated as a single interface 402 in FIG. 4, two or more interfaces 402 may be used according to particular needs, desires, or particular implementations of the computer 400. The interface 402 is used by the computer 400 for communicating with other systems in a distributed environment connected to a network (whether illustrated or not). Generally, the interface 402 comprises logic encoded in software and/or hardware in a suitable combination and operable to communicate with the network. More specifically, the interface 402 may comprise software supporting one or more communication protocols associated with communications such that the network or interface's hardware is operable to communicate physical signals within and outside of the computer 400.

The computer 400 includes at least one processor 404. Although illustrated as a single processor 404 in FIG. 4, two or more processors may be used according to particular needs, desires, or particular implementations of the computer. Generally, the processor 404 executes instructions and manipulates data to perform the operations of the computer 400. Specifically, the processor 404 executes the functionality disclosed in FIGS. 1-4.

The computer 400 also includes a memory 414 that holds data for the computer 400. Although illustrated as a single memory 414 in FIG. 4, two or more memories may be used according to particular needs, desires, or particular implementations of the computer 400. While memory 414 is illustrated as an integral component of the computer 400, in alternative implementations, memory 414 can be external to the computer 400.

The application 406 is an algorithmic software engine providing functionality according to particular needs, desires, or particular implementations of the computer 400, particularly with respect to functionality required for anomaly detection. Although illustrated as a single application 406, the application 406 may be implemented as multiple applications 406 on the computer 400. In addition, although illustrated as integral to the computer 400, in alternative implementations, the application 406 can be external to the computer 400.

There may be any number of computers 400 associated with, or external to, and communicating over a network. Furthermore, this disclosure contemplates that many users may use one computer 400, or that one user may use multiple computers 400.

Described implementations of the subject matter can include one or more features, alone or in combination.

For example, in a first implementation, a method, comprising: obtaining, by an electronic device, a set of software features of a software code; obtaining, by the electronic device, a set of user features of a user of the electronic device; and determining, by the electronic device, a classification score of the software code based on the set of software features and the set of the user features, wherein the classification score indicates whether the software code is potentially unwanted for the user.

The foregoing and other described implementations can each, optionally, include one or more of the following features:

A first feature, combinable with any of the following features, wherein the determining the classification score comprises: determining a software feature vector based on the set of software features; determining a user feature vector based on the set of user features; and determining the classification score based on the software feature vector and the user feature vector.

A second feature, combinable with any of the previous or following features, wherein the determining the classification score comprises: sending the set of software features and the set of user features to a server; and in response to the sending set of software features and the set of user features, receiving the classification score from the server.

A third feature, combinable with any of the previous or following features, further comprising: comparing the classification score with a threshold score; and in response to determining that the classification score meets the threshold score, allowing access to the software code.

A fourth feature, combinable with any of the previous or following features, wherein the classification score is calculated using a machine learning operation.

A fifth feature, combinable with any of the previous or following features, wherein machine learning operations comprises processing a software feature vector by using a first machine learning model and processing a user feature vector by using a second machine learning model.

A sixth feature, combinable with any of the previous features, further comprising: outputting an indication indicating whether the software code is potentially unwanted for the user.

In a second implementation, a computer-readable medium containing instructions which, when executed, cause an electronic device to perform operations comprising: obtaining a set of software features of a software code; obtaining a set of user features of a user of the electronic device; and determining a classification score of the software code based on the set of software features and the set of the user features, wherein the classification score indicates whether the software code is potentially unwanted for the user.

The foregoing and other described implementations can each, optionally, include one or more of the following features:

A first feature, combinable with any of the following features, wherein the determining the classification score comprises: determining a software feature vector based on the set of software features; determining a user feature vector based on the set of user features; and determining the classification score based on the software feature vector and the user feature vector.

A second feature, combinable with any of the previous or following features, wherein the determining the classification score comprises: sending the set of software features and the set of user features to a server; and in response to the sending set of software features and the set of user features, receiving the classification score from the server.

A third feature, combinable with any of the previous or following features, the operations further comprising: comparing the classification score with a threshold score; and in response to determining that the classification score meets the threshold score, allowing access to the software code.

A fourth feature, combinable with any of the previous or following features, wherein the classification score is calculated using a machine learning operation.

A fifth feature, combinable with any of the previous or following features, wherein machine learning operations comprises processing a software feature vector by using a first machine learning model and processing a user feature vector by using a second machine learning model.

A sixth feature, combinable with any of the previous features, the operations further comprising: outputting an indication indicating whether the software code is potentially unwanted for the user.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: obtaining a set of software features of a software code; obtaining a set of user features of a user of an electronic device; and determining a classification score of the software code based on the set of software features and the set of the user features, wherein the classification score indicates whether the software code is potentially unwanted for the user.

The foregoing and other described implementations can each, optionally, include one or more of the following features:

A first feature, combinable with any of the following features, wherein the determining the classification score comprises: determining a software feature vector based on the set of software features; determining a user feature vector based on the set of user features; and determining the classification score based on the software feature vector and the user feature vector.

A second feature, combinable with any of the previous or following features, wherein the determining the classification score comprises: sending the set of software features and the set of user features to a server; and in response to the sending set of software features and the set of user features, receiving the classification score from the server.

A third feature, combinable with any of the previous or following features, the operations further comprising: comparing the classification score with a threshold score; and in response to determining that the classification score meets the threshold score, allowing access to the software code.

A fourth feature, combinable with any of the previous or following features, wherein the classification score is calculated using a machine learning operation.

A fifth feature, combinable with any of the previous or following features, wherein machine learning operations comprises processing a software feature vector by using a first machine learning model and processing a user feature vector by using a second machine learning model.

A sixth feature, combinable with any of the previous features, the operations further comprising: outputting an indication indicating whether the software code is potentially unwanted for the user.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a Global Positioning System (GPS) receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security, or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless LAN (WLAN) using, for example, 802.11 a/b/g/n/ac/ax/be and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A method, comprising:
   obtaining, by an electronic device, a set of software features of a software code;
   obtaining, by the electronic device, a set of user features of a user of the electronic device; and
   determining, by the electronic device, a classification score of the software code based on the set of software features and the set of the user features, wherein the classification score indicates whether the software code is potentially unwanted for the user, wherein the determining the classification score comprises:
      obtaining a software output vector by using a first machine learning model to process a software feature vector representing the set of software features of the software code;
      obtaining a user output vector by using a second machine learning model to process a user feature vector representing the set of user features of the user, wherein the software feature vector and the user feature vector have different lengths, and the user output vector and the software output vector have a same length; and
      determining the classification score of the software code based on the software output vector and the user output vector; and
   outputting an indication indicating whether the software code is potentially unwanted for the user.

2. The method of claim 1, wherein the determining the classification score comprises:
   determining the software feature vector based on the set of software features; and
   determining the user feature vector based on the set of user features.

3. The method of claim 1, wherein the determining the classification score comprises:
   sending the set of software features and the set of user features to a server; and in response to the sending of the set of software features and the set of user features, receiving the software feature vector and the user feature vector from the server.

4. The method of claim 1, further comprising:

comparing the classification score with a threshold score; and in response to determining that the classification score meets the threshold score, allowing access to the software code.

5. The method of claim 1, wherein the set of user features comprises a name of the user, a geographic location of the user, and an employer of the user.

6. The method of claim 1, wherein the set of user features comprises information of a browsing history, an access history, an application installation history, and an application usage history of the user.

7. The method of claim 1, wherein the set of user features comprises information of a hardware configuration of the electronic device and a software configuration of the electronic device.

8. The method of claim 1, wherein the set of software features comprises a file size of the software code, a file format of the software code, and a second indication indicating whether the software code is binary code or source code.

9. The method of claim 1, wherein the set of software features comprises at least a part of the software code.

10. A non-transitory computer-readable medium containing instructions which, when executed, cause an electronic device to perform operations comprising:

obtaining a set of software features of a software code;

obtaining a set of user features of a user of the electronic device; and determining a classification score of the software code based on the set of software features and the set of the user features, wherein the classification score indicates whether the software code is potentially unwanted for the user, wherein the determining the classification score comprises:

obtaining a software output vector by using a first machine learning model to process a software feature vector representing the set of software features of the software code;

obtaining a user output vector by using a second machine learning model to process a user feature vector representing the set of user features of the user, wherein the software feature vector and the user feature vector have different lengths, and the user output vector and the software output vector have a same length; and determining the classification score of the software code based on the software output vector and the user output vector; and outputting an indication indicating whether the software code is potentially unwanted for the user.

11. The computer-readable medium of claim 10, wherein the determining the classification score comprises:

determining the software feature vector based on the set of software features; and determining the user feature vector based on the set of user features.

12. The computer-readable medium of claim 10, wherein the determining the classification score comprises: sending the set of software features and the set of user features to a server; and in response to the sending of the set of software features and the set of user features, receiving the software feature vector and the user feature vector from the server.

13. The computer-readable medium of claim 10, the operations further comprising:

comparing the classification score with a threshold score; and in response to determining that the classification score meets the threshold score, allowing access to the software code.

14. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining a set of software features of a software code;

obtaining a set of user features of a user of an electronic device; and determining a classification score of the software code based on the set of software features and the set of the user features, wherein the classification score indicates whether the software code is potentially unwanted for the user, wherein the determining the classification score comprises:

obtaining a software output vector by using a first machine learning model to process a software feature vector representing the set of software features of the software code;

obtaining a user output vector by using a second machine learning model to process a user feature vector representing the set of user features of the user, wherein the software feature vector and the user feature vector have different lengths, and the user output vector and the software output vector have a same length; and determining the classification score of the software code based on the software output vector and the user output vector; and outputting an indication indicating whether the software code is potentially unwanted for the user.

15. The computer-implemented system of claim 14, wherein the determining the classification score comprises:

determining the software feature vector based on the set of software features; and determining the user feature vector based on the set of user features.

16. The computer-implemented system of claim 14, wherein the determining the classification score comprises: sending the set of software features and the set of user features to a server; and in response to the sending of the set of software features and the set of user features, receiving the software feature vector and the user feature vector from the server.

17. The computer-implemented system of claim 14, the operations further comprising:

comparing the classification score with a threshold score; and in response to determining that the classification score meets the threshold score, allowing access to the software code.

* * * * *